United States Patent
Tien

(10) Patent No.: US 7,541,978 B2
(45) Date of Patent: Jun. 2, 2009

(54) ANTENNA-ASSISTED TWO-POINT POSITIONING SYSTEM

(75) Inventor: Kai-Wen Tien, Tainan (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 0 days.

(21) Appl. No.: 12/003,605

(22) Filed: Dec. 28, 2007

(65) Prior Publication Data

US 2009/0073044 A1 Mar. 19, 2009

(30) Foreign Application Priority Data

Sep. 14, 2007 (TW) .............................. 96134400 A

(51) Int. Cl.
*G01S 3/02* (2006.01)
(52) U.S. Cl. .................. 342/465; 342/451; 342/458; 342/463
(58) Field of Classification Search ................. 342/451, 342/458, 463, 465, 374, 377, 432–435, 438–439

See application file for complete search history.

(56) References Cited

U.S. PATENT DOCUMENTS

2005/0032531 A1* 2/2005 Gong et al. ............. 342/357.02

* cited by examiner

*Primary Examiner*—Thomas H Tarcza
*Assistant Examiner*—Fred H Mull
(74) *Attorney, Agent, or Firm*—Reed Smith LLP; Juan Carlos A. Marquez, Esq.

(57) ABSTRACT

An antenna-assisted two-point positioning system for positioning a mobile device is disclosed. The antenna-assisted two-point positioning system comprises a first wireless communication module comprising first antennas, a second wireless communication module comprising second antennas, a storage module, and a processing module. The mobile device transmits a first signal strength to a first antenna for a first receive signal strength and a second signal strength to a second antenna for a second receive signal strength. The second wireless communication module and the first wireless communication module determine a first position and a second position corresponding to the mobile device. The storage module stores first antenna gain tables corresponding to the first antennas and second antenna gain tables corresponding to the second antennas. The processing module is used for judging whether an environmental interference factor is ignorable to selectively judge that the mobile device is located at the first or second position.

16 Claims, 10 Drawing Sheets

| θ | θm1 | θm2 | θm3 | ••• | θmn |
| G | Gm1 | Gm2 | Gm3 | ••• | Gmn |

ANTENNA-ASSISTED TWO-POINT POSITIONING SYSTEM

BACKGROUND OF THE INVENTION

1. Field of the Invention

The invention relates to a positioning system and, more particularly, to a positioning system which utilizes antenna-assisted positioning method to achieve two-point positioning.

2. Description of the Prior Art

In general, three-point positioning method is mostly applied to wireless communication, such as time of arrival (TOA) algorithm, receive signal strength (RSS) algorithm and other similar positioning techniques, as shown in FIG. 1A. However, no matter what is applied to, three base stations are required for positioning a mobile device. In other words, if TOA algorithm or RSS algorithm is applied to a two-point positioning method, it will be difficult to make a precise judgment on the position of the mobile device, as shown in FIG. 1B.

When applying two-point positioning method to the mobile device, angle of arrival (AOA) is mostly used, as shown in FIG. 2. AOA algorithm measures at least two different angles $\alpha_1$ and $\alpha_2$ of arriving signal at the base station 1 and 2 transmitted from the mobile device 3 to determine a position of the transmitting signal. In order to confirm direction of the signal, an intelligent antenna array system has to be disposed on an antenna of a base station. As a result, huge cost is induced. Besides, AOA algorithm is also easily affected by environment factors, such as none-line-of-sigh (NLOS).

Accordingly, the scope of the invention is to provide a positioning system, so as to solve the aforesaid problems.

SUMMARY OF THE INVENTION

A scope of the invention is to provide a positioning system which applies antenna-assisted positioning method to TOA and RSS positioning algorithms to achieve two-point positioning.

According to a preferred embodiment, the positioning system of the invention is used for positioning a mobile device. A positioning system comprises a first wireless communication module, a second wireless communication module, a storage module and a processing module. The first wireless communication module comprises M first antennas and the second wireless communication module comprises N second antennas, wherein both M and N are integers larger than or equal to 1, and N is different from M. The storage module stores M first antenna gain tables corresponding to the M first antennas and N second antenna gain tables corresponding to the N second antennas.

In this embodiment, the mobile device transmits a first receive signal strength ($RSS_1$) to the i-th first antenna and transmits a second receive signal strength ($RSS_2$) to the j-th second antenna, wherein i is an integer between 1 and M, and j is an integer between 1 and N. The second wireless communication module cooperates with the first wireless communication module and utilizes TOA and RSS algorithms to determine a first position and a second position corresponding to the mobile device.

The processing module is used for judging whether an environmental interference factor is ignorable. When the environmental interference factor is ignorable, the processing module judges that the mobile device is located at the first or second position based on the first receive signal strength, the second receive signal strength, the i-th first antenna gain table and the j-th second antenna gain table.

Accordingly, when the invention presented is applied to two-point positioning method, it has following advantages: (1) more precise (lower interference); (2) farther distance and range while positioning (not limited to LOS and NLOS environment; AOA is limited to LOS environment.); (3) lower cost (intelligent antenna array system is needed in AOA but not required in the invention presented); and (4) more reliable than AOA algorithm.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
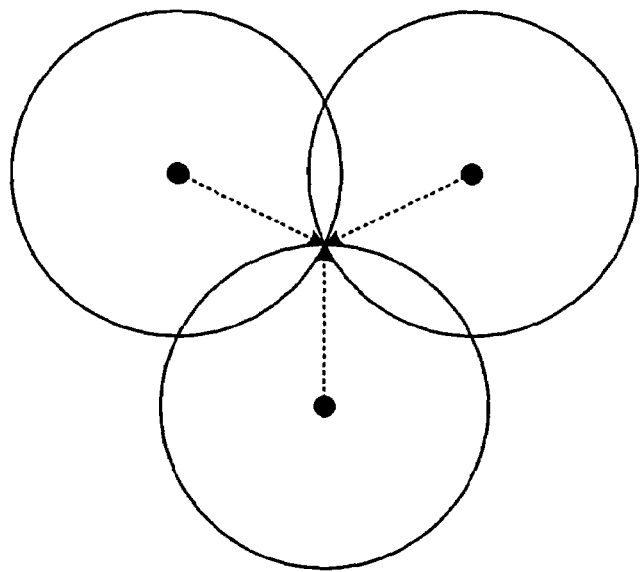
FIG. 1A is a schematic diagram illustrating three-point positioning method.
Figure 1B:
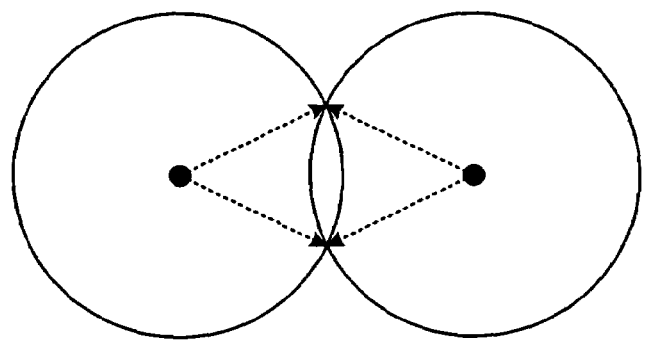
FIG. 1B is a schematic diagram illustrating two-point positioning method.
Figure 2:
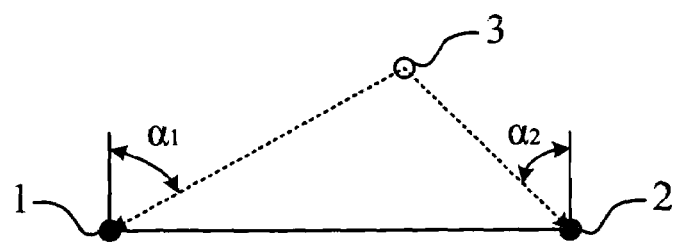
FIG. 2 is a schematic diagram illustrating angle of arrival positioning method.
Figure 3A:
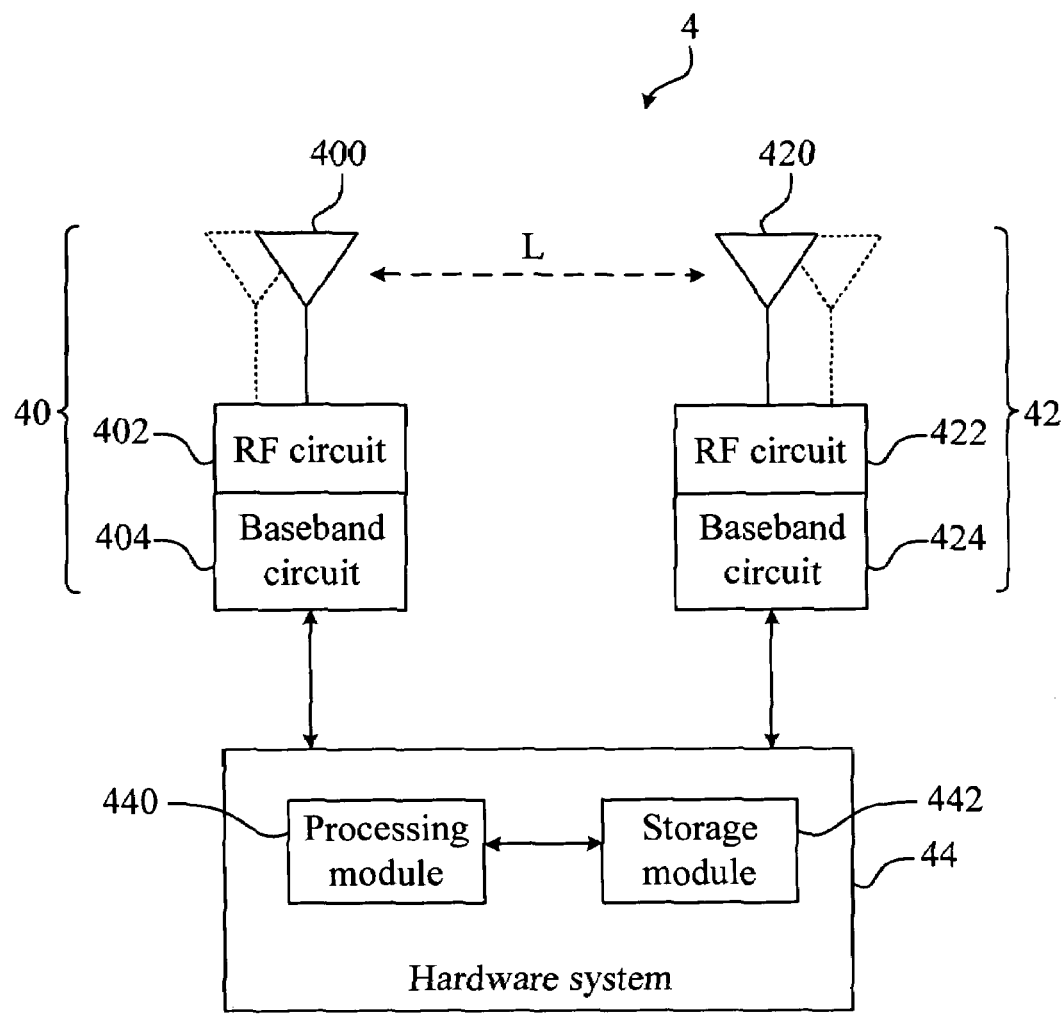
FIG. 3A is a functional block diagram illustrating a positioning system according to a preferred embodiment of the invention.
Figure 3B:
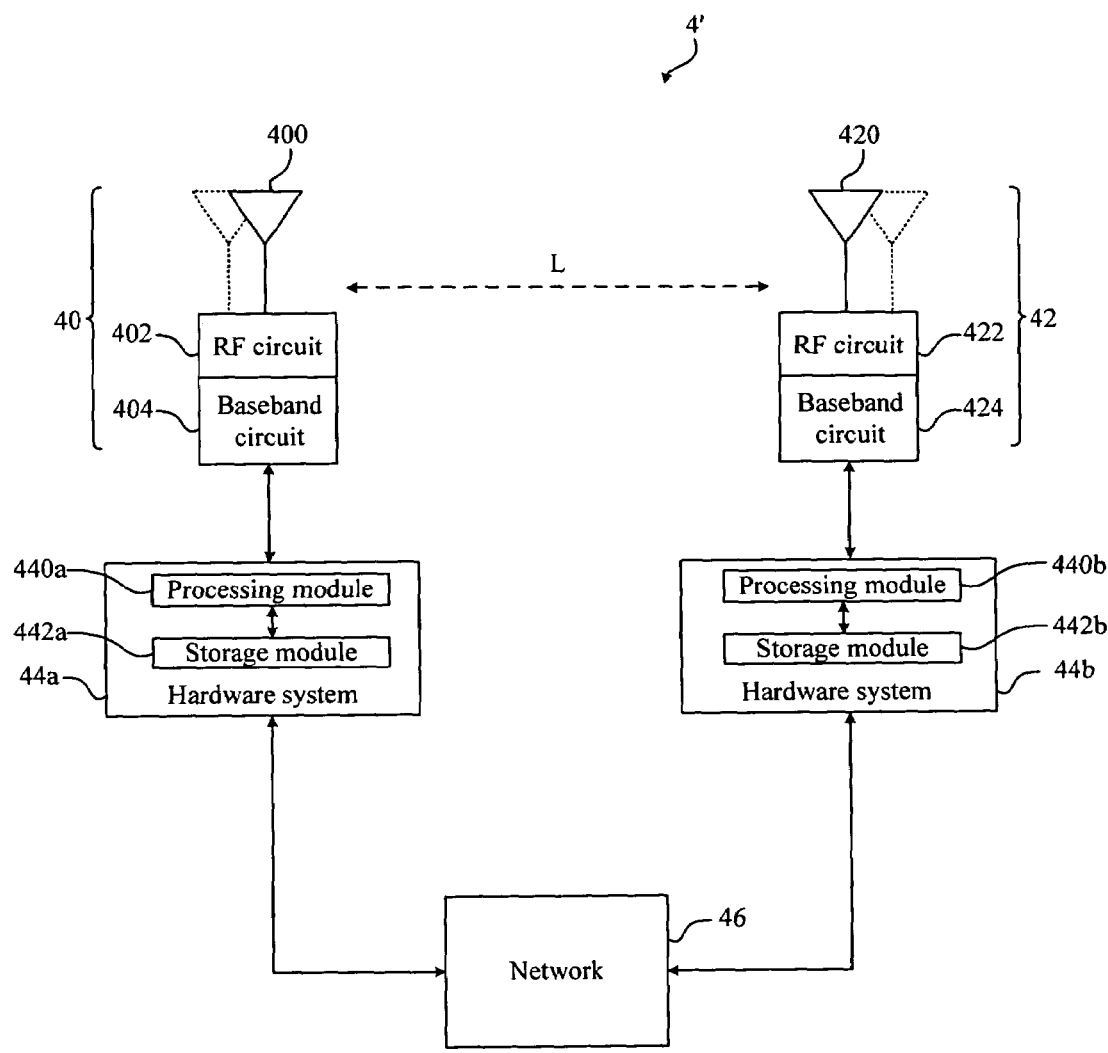
FIG. 3B is a functional block diagram illustrating a positioning system according to another preferred embodiment of the invention.
Figure 3C:
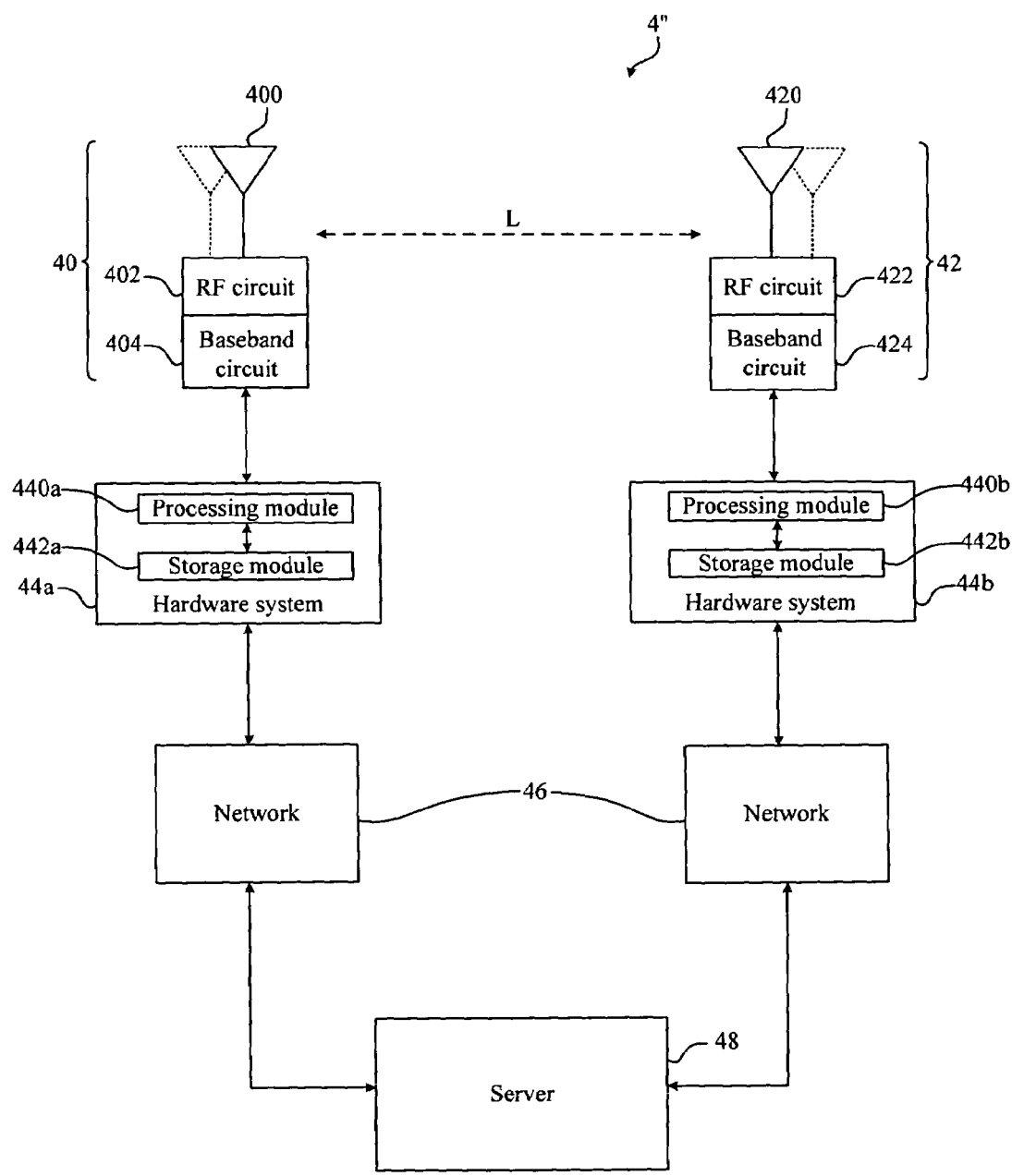
FIG. 3C is a functional block diagram illustrating a positioning system according to another preferred embodiment of the invention.

Please refer to FIG. 3A through FIG. 3C. FIG. 3A is a functional block diagram illustrating a positioning system 4 according to a preferred embodiment of the invention. FIG. 3B is a functional block diagram illustrating a positioning system 4' according to another preferred embodiment of the invention. FIG. 3C is a functional block diagram illustrating a positioning system 4" according to another preferred embodiment of the invention.

The positioning system of the invention can be three modes as follows: (1) a first wireless communication module 40 and a second wireless communication module 42 are coupled to an identical hardware system 44, as shown in FIG. 3A; (2) a first wireless communication module 40 and a second wireless communication module 42 are respectively coupled to two different hardware systems 44a and 44b, and communicated with each other through a network 46, as shown in FIG. 3B; and (3) a first wireless communication module 40 and a second wireless communication module 42 are respectively coupled to two different hardware systems 44a and 44b, and communicated with each other through a network 46 and a server 48, as shown in FIG. 3C. It has to be noticed both the first wireless communication module 40 and the second wireless communication module 42 are fixed wireless communication modules.

In this invention, the first and second wireless communication modules 40 and 42 have the same wireless communication standard. (Since if the same wireless communication module is used, positioning accuracy will be higher.) In positioning, the hardware system should needs to control the antennas of the first and second wireless communication modules 40 and 42 to transmit the same radio power. The distance between the first and second wireless communication modules 40 and 42 is L, and the first and second wireless communication modules 40 and 42 respectively comprise a first antenna 400, a second antenna 420, RF circuits 402 and 422, baseband circuits 404 and 424. It should be noticed that, in FIG. 3A through FIG. 3C, a dotted line shows that multiple antennas are feasible to be disposed. The hardware systems 44, 44a or 44b can comprise processing modules 440, 440a or 440b, storage modules 442, 442a or 442b and any other required hardware for different applications.

Figures 4, 5:
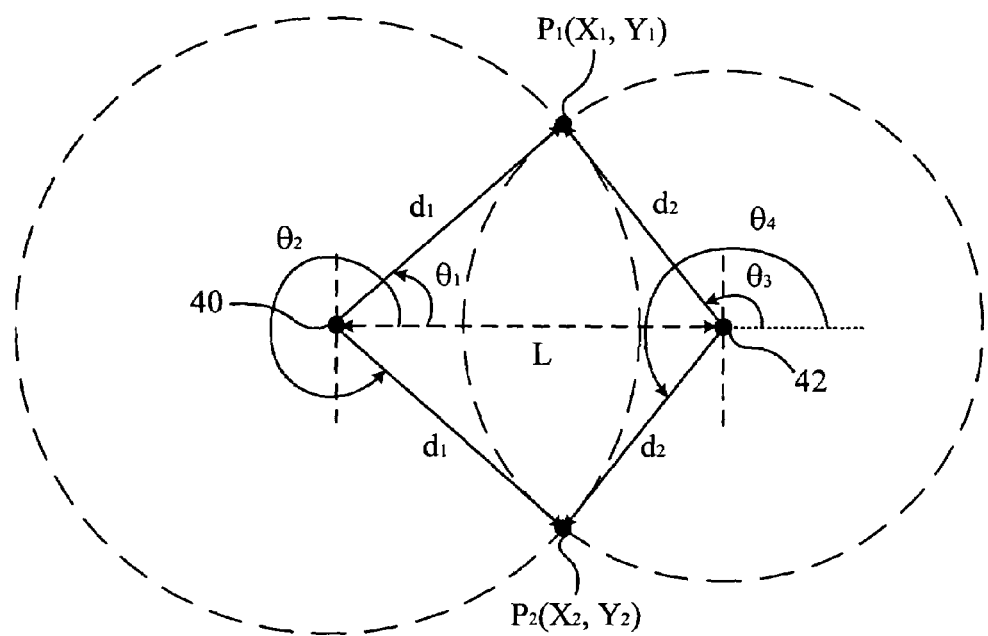
FIG. 4 is a schematic diagram illustrating a first wireless communication module cooperated with the second wireless communication module to determine a position corresponding to a mobile device.
FIG. 5 is a schematic diagram illustrating an antenna gain table.

Please refer to FIG. 4. FIG. 4 is a schematic diagram illustrating a first wireless communication module 40 cooperates with the second wireless communication module 42 to determine the position $P_1$ and the position $P_2$ corresponding to a mobile device (not shown). The distance between the mobile device and the first wireless communication modules 40 is $d_1$, the distance between the mobile device and the second wireless communication modules 42 is $d_2$, and the distance between the first wireless communication modules 40 and the second wireless communication modules 42 is L. In this embodiment, the first and second wireless communication modules 40 and 42 utilize wireless positioning algorithms, such as TOA or RSS, to respectively obtain $d_1$ and $d_2$, and the distance L between the first and second wireless communication modules 40 and 42 is known, then an angle $\theta_1$ can be obtained from $d_1$, $d_2$ and L by utilizing cosine theorem.

cosine theorem: $\cos \theta_1 = \frac{d_1^2 + L^2 - d_2^2}{2 d_1 L}$, then $\theta_1 = \cos^{-1}\left(\frac{d_1^2 + L^2 - d_2^2}{2 d_1 L}\right)$.

$\theta_2 = 360 - \theta_1$. Similarly, $\theta_3 = 180 - \cos^{-1}\left(\frac{d_2^2 + L^2 - d_1^2}{2 d_2 L}\right)$, and $\theta_4 = 360 - \theta_3$.

A coordinate $(X_1, Y_1)$ of the position $P_1$ can be obtained by transforming $d_1$ and $\theta_1$ or $d_2$ and $\theta_2$. If the first wireless communication module 40 is set as a reference origin of coordinates, then $X_1 = d_1 \cos \theta_1$ and $Y_1 = d_1 \sin \theta_1$. Similarly, a coordinate $(X_2, Y_2)$ of the position $P_2$ also can be obtained by this process.

Please refer to FIG. 5. FIG. 5 is a schematic diagram illustrating an antenna gain table. Each antenna has a corresponding antenna gain table. As shown in FIG. 5, m indicates a m-th antenna; n can be set as 360 or adjusted by designers according to practical applications, and G indicates an antenna gain. The invention shows the relation between the antenna gain G and the angle θ by utilizing antenna gain tables.

As for the techniques and other efficacy adopted by the invention presented, the following several embodiments are provided for further explanation:

The First Embodiment

The first embodiment utilizes a positioning system 4 shown in FIG. 3A to illustrate how to judge that a mobile device is located at the position $P_1$ or the position $P_2$ shown in FIG. 4.

In this embodiment, the first wireless communication module 40 comprises M first antennas, and the second wireless communication module 42 comprises N second antennas, wherein M and N is an integer larger than or equal to 1, and N is different from M. A storage module 442 is used for storing M first antenna gain tables corresponding to the M first antennas and N second antenna gain tables corresponding to the N second antennas. The first antenna gain tables and the second antenna gain tables are shown in FIG. 5.

At the beginning of positioning, the first and second wireless communication module 40 and 42 utilize TOA for positioning a mobile device to obtain $d_1$, $d_2$, $\theta_1$, $\theta_2$, $\theta_3$ and $\theta_4$, wherein $\theta_1$, $\theta_2$, $\theta_3$ and $\theta_4$ can be obtained by the above mentioned method. Furthermore, the mobile device transmits a receive signal strength (RSS) to the processing module 440, wherein the mobile device transmits a first receive signal strength ($RSS_1$) to the i-th first antenna and transmits a second receive signal strength ($RSS_2$) to the j-th second antenna, wherein i is an integer between 1 and M, and j is an integer between 1 and N.

The processing module 440 utilizes d and θ to calculate. Let $$K_1 = \frac{G_1}{d_1^2}, K_2 = \frac{G_2}{d_1^2}, K_3 = \frac{G_3}{d_2^2} \text{ and } K_4 = \frac{G_4}{d_2^2},$$

the processing module 440 obtains $K_1$, $K_2$, $K_3$ and $K_4$, wherein $G_1$, $G_2$, $G_3$ and $G_4$ can be obtained from the antenna gain table corresponding to θ. Without taking the effects of environment and other interference into consideration, in free space, $$\frac{G}{d^2}$$

is proportional to power received by a receiving terminal, wherein G is a gain of a transmitting antenna, and d is the distance between a transmitting terminal and a receiving terminal.

Before judging whether the position $P_1$ or $P_2$ is the real positioning location, it is necessary to confirm the problems of interference to increase the reliability of estimation of $$\frac{G}{d^2}.$$

Therefore, the invention provides three methods as follows:

(1) Consider the successful demodulation rate obtained by baseband circuits 404 and 424 at the receiving terminals (i.e. the first and second wireless communication module 40 and 42). Namely, the successful demodulation rate refers to the percentage of all information received by the usable target information receiving terminals. Accordingly, a successful demodulation rate value can be set as a criterion (e.g. 80%). Then, if the rate is above the criterion, it can be assumed that the environmental interference is not serious.

(2) Estimate the environmental interference effect by the number of times for retransmission. Since there is a counter in the transmitting terminal or the receiving terminal, the counter has a duty cycle for calculating the number of times for retransmission during the duty cycle. Therefore, when the number of times for retransmission is less than a third predetermined value, the processing module will make a judgment that the environmental interference factor can be ignorable. For instance, the third predetermined value can be set as n, and n can be set by a designer according to different wireless communication standards. Moreover, n also can be determined by the demodulation rate. For example, if the denotation rate is 80%, the counter n record by the counter at that time will be the correspondent.

(3) When one of the following inequalities is satisfied, the processing module 440 will judge that the environmental interference factor can be ignorable.

$$\left| \frac{K_1 - K_3}{K_1} *100\% - \frac{RSS_1 - RSS_2}{RSS_1} *100\% \right| \leq \text{a first predetermined value.} \quad \text{Inequality 1}$$

$$\left| \frac{K_2 - K_4}{K_2} *100\% - \frac{RSS_1 - RSS_2}{RSS_1} *100\% \right| \leq \text{the first predetermined value.} \quad \text{Inequality 2}$$

In this embodiment, the first predetermined value can be set by a designer according to practical applications, such as 20%~30%.

When the environmental interference factor is ignorable and both of the following inequalities are satisfied, the processing module 440 will judge that the mobile device is located at the first position $P_1$ shown in FIG. 4.

$$\frac{\Phi_1 - \Phi_2}{\Phi_1} *100\% \geq \text{a second predetermined value.} \quad \text{Inequality 3}$$

$$|\Delta_1 - \Delta| \leq |\Delta_2 - \Delta|. \quad \text{Inequality 4}$$

wherein, $\Delta_1 = \frac{K_1 - K_3}{K_1}$, $\Delta_2 = \frac{K_2 - K_4}{K_2}$, $\Delta = \frac{RSS_1 - RSS_2}{RSS_1}$, $\Phi_1 = \frac{\Delta_1 - \Delta}{\Delta_1}$ and $\Phi_2 = \frac{\Delta_2 - \Delta}{\Delta_2}$ On the other hand, when the environmental interference factor is ignorable and both of the following inequalities are satisfied, the processing module 440 will judge that the mobile device is located at the second position $P_2$ shown in FIG. 4.

$$\frac{\Phi_1 - \Phi_2}{\Phi_1} *100\% \geq \text{the second predetermined value.} \quad \text{Inequality 3}$$

$$|\Delta_2 - \Delta| \leq |\Delta_1 - \Delta|. \quad \text{Inequality 5}$$

In this embodiment, the second predetermined value is defined as a difference percentage of the positions $P_1$ and $P_2$ and can be set by a designer according to practical applications, such as 50%.

$$\text{If } \frac{\Phi_1 - \Phi_2}{\Phi_1} *100\%$$

is smaller than the standard set by the designer (such as 50%), the real positioning location will be hard to be confirmed. The reasons might be from the antenna patterns of the first wireless communication modules 40, second wireless communication modules 42 and the mobile device. In conclusion, it will be finished if the real positioning location can be judged.

However, when the environmental interference factor is significant, or the i-th first antenna and the j-th second antenna are unable to position the mobile device, the processing module 440 will selectively switch the i-th first antenna to one of the remainder M−1 first antennas. Then, the mobile device transmits a third receive signal strength ($RSS_3$) to the switched first antenna. Therefore, the processing module 440 obtains a fifth gain ($G_5$) corresponding to the first angle ($\theta_1$) and a sixth gain ($G_6$) corresponding to the second angle ($\theta_2$) based on the first antenna gain table corresponding to the switched first antenna. When one of the following conditions is satisfied, the processing module 440 judges that the mobile device is located at the first position $P_1$ shown in FIG. 4.

$G_5 > G_1$, $RSS_3 > RSS_1$ and $G_6 \leq G_2$.      Condition 1

$G_5 < G_1$, $RSS_3 < RSS_1$ and $G_6 \geq G_2$.      Condition 2

On the other hand, when one of the following conditions is satisfied, the processing module 440 judges that the mobile device is located at the second position $P_2$ shown in FIG. 4.

$G_6 > G_2$, $RSS_3 > RSS_1$ and $G_5 \leq G_1$.      Condition 3

$G_6 < G_2$, $RSS_3 < RSS_1$ and $G_5 \geq G_1$.      Condition 4

Figure 6:
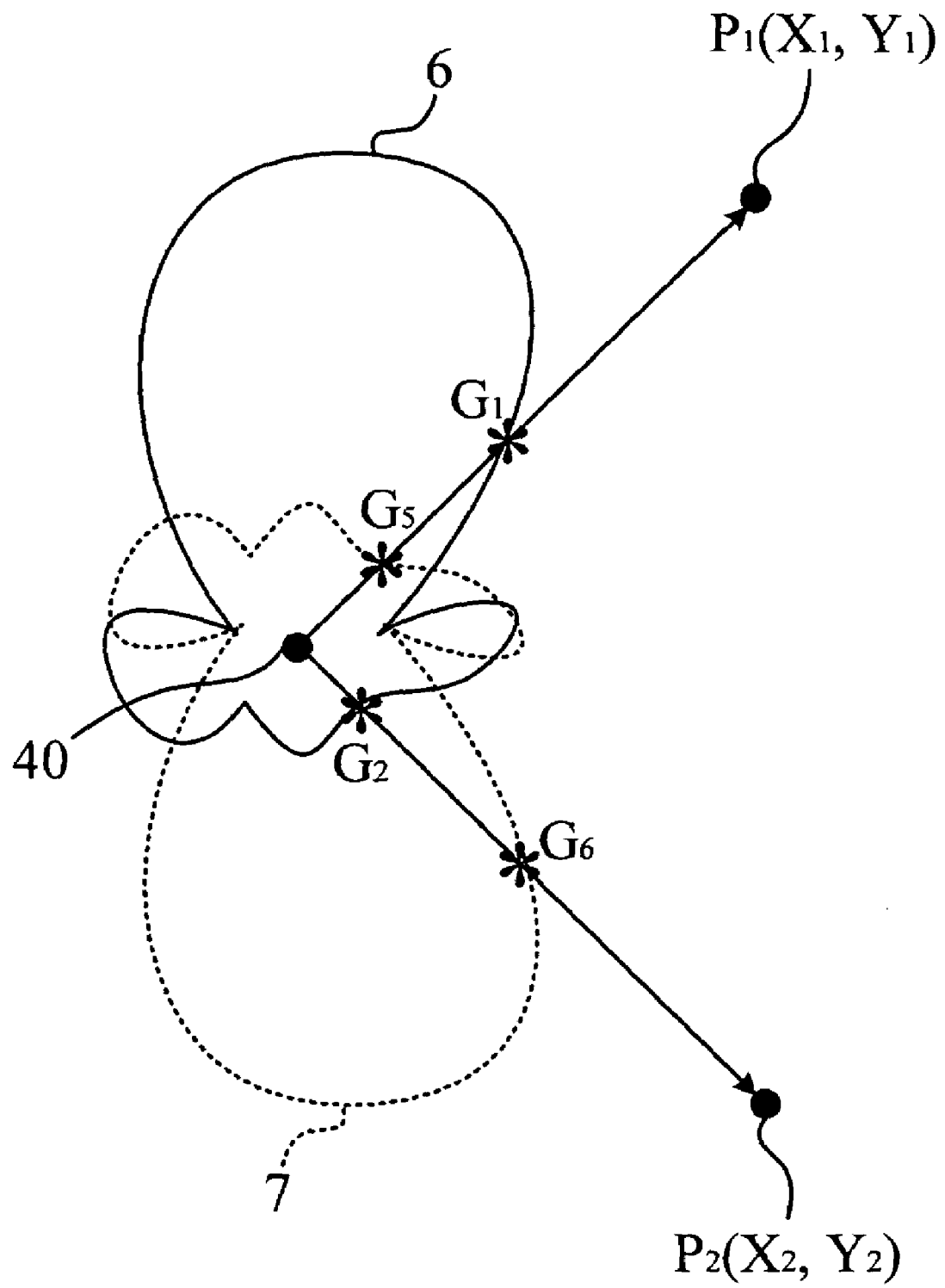
FIG. 6 is a schematic diagram illustrating an antenna pattern before switching and after switching.

Please refer to FIG. 6. FIG. 6 is a schematic diagram illustrating an antenna pattern before switching and after switching. A solid line 6 indicates an antenna pattern of the original i-th first antenna, and a dotted line 7 indicates an antenna pattern of the switched first antenna. As shown in FIG. 6, $G_5 < G_1$ and $G_6 \geq G_2$, as $RSS_3 < RSS_1$, the processing module 440 judges that the mobile device is located at the first position $P_1$ shown in FIG. 4 based on condition 2 described as above.

Similarly, when the environmental inference factor is significant, or the i-th first antenna and j-th second antenna are unable to position the mobile device, the processing module 440 also can selectively switch the j-th second antenna to one of the remainder N−1 second antennas. Then, the mobile device transmits a fourth receive signal strength ($RSS_4$) to the switched second antenna. Therefore, the processing module 440 obtains a seventh gain ($G_7$) corresponding to the third angle $\theta_3$ and an eighth gain ($G_8$) corresponding to the fourth angle $\theta_4$ based on the second antenna gain table corresponding to the switched second antenna. When one of the following conditions is satisfied, the processing module 440 judges that the mobile device is located at the first position $P_1$ shown in FIG. 4.

$G_7 > G_3$, $RSS_4 > RSS_2$ and $G_8 \leq G_4$.      Condition 5

$G_7 < G_3$, $RSS_4 < RSS_2$ and $G_8 \geq G_4$.      Condition 6

On the other hand, when one of the following conditions is satisfied, the processing module 440 judges that the mobile device is located at the second position P$_2$ shown in FIG. 4.

$G_8 > G_4$, RSS$_4$ > RSS$_2$ and $G_7 \leq G_3$.         Condition 7

$G_8 < G_4$, RSS$_4$ < RSS$_2$ and $G_7 \geq G_3$.         Condition 8

It should be noticed that if the first and second wireless communication module 40 and 42 utilize RSS algorithm to position the mobile device, after the antenna is switched, the mobile device has to be re-positioned to obtain a new distance d and angle θ. And, if the new θ is different to the old θ, the new θ is being substituted for the old θ.

Besides, the invention also can utilize the positioning system 4' shown in FIG. 3B or the positioning system 4'' shown in FIG. 3C to judge that the mobile device is located at the position P$_1$ or the position P$_2$ shown in FIG. 4. The hardware system 44 can be substituted by the hardware system 44a or 44b, the processing module 440 can be substituted by the processing module 440a or 440b, and the storage module 442 can be substituted by the storage module 442a or 442b; it all depends on practical applications.

A Second Embodiment

The second embodiment utilizes a positioning system 4 shown in FIG. 3A to describe how to judge that the mobile device is located at the position P$_1$ or the position P$_2$.

In this embodiment, a first wireless communication module 40 comprises M first antennas, and a second wireless communication module 42 also comprises M second antennas, wherein M is an integer larger than or equal to 1, and each of the second antennas respectively corresponds to one of the M first antennas. A storage module 442 stores M first antenna gain tables corresponding to the M first antennas and M second antenna gain tables corresponding to the M second antennas. The first antenna gain tables or the second antenna gain tables are shown as FIG. 5.

At the beginning of positioning, the first and second wireless communication module 40 and 42 utilize TOA for positioning a mobile device to obtain d$_1$, d$_2$, θ$_1$, θ$_2$, θ$_3$ and θ$_4$, wherein θ$_1$, θ$_2$, θ$_3$ and θ$_4$ can be obtained by the above mentioned method. Furthermore, the mobile device transmits a receive signal strength (RSS) to a processing module 440, wherein the mobile device transmits a first receive signal strength (RSS$_1$) to the i-th first antenna and transmits a second receive signal strength (RSS$_2$) to the i-th second antenna, wherein i is an integer between 1 and M.

The processing module 440 utilizes d and θ to calculate.

Let $K_1 = \frac{G_1}{d_1^2}$, $K_2 = \frac{G_2}{d_1^2}$, $K_3 = \frac{G_3}{d_2^2}$ and $K_4 = \frac{G_4}{d_2^2}$, the processing module 440 obtains K$_1$, K$_2$, K$_3$ and K$_4$, wherein G$_1$, G$_2$, G$_3$ and G$_4$ can be obtained from the antenna gain table corresponding to θ.

Before judging whether the position P$_1$ or P$_2$ is the real positioning location, the problems of interference have to be confirmed to increase the reliability of the estimation of G/d$^2$. Concerning how to determine the interference, please refer to relations described in the first embodiment, which is not mentioned herein.

When the environment inference factor is ignorable and both of the following inequalities are satisfied, the processing module 440 judges that the mobile device is located at the first position P$_1$ shown in FIG. 4.

$\frac{\Phi_1 - \Phi_2}{\Phi_1} * 100\% \geq$ a second predetermined value.     Inequality 3

$|\Delta_1 - \Delta| \leq |\Delta_2 - \Delta|$; wherein, $\Delta_1 = \frac{K_1 - K_3}{K_1}$,     Inequality 4

$\Delta_2 = \frac{K_2 - K_4}{K_2}, \Delta = \frac{RSS_1 - RSS_2}{RSS_1}$, $\Phi_1 = \frac{\Delta_1 - \Delta}{\Delta_1}$ and $\Phi_2 = \frac{\Delta_2 - \Delta}{\Delta_2}$.

On the other hand, when the environment inference factor is ignorable and both of the following inequalities are satisfied, the processing module 440 judges that the mobile device is located at the second position P$_2$ shown in FIG. 4.

$\frac{\Phi_1 - \Phi_2}{\Phi_1} * 100\% \geq$ the second predetermined value.     Inequality 3

$|\Delta_2 - \Delta| \leq |\Delta_1 - \Delta|$.     Inequality 5

In this embodiment, the second predetermined value is defined as a difference percentage of the positions P$_1$ and P$_2$ and set by a designer according to practical applications, such as 50%. If $\frac{\Phi_1 - \Phi_2}{\Phi_1} * 100\%$ is smaller than the standard set by the designer (such as 50%), the real positioning location will be hard to be confirmed. The reason might be the antenna patterns of the first wireless communication modules 40, the second wireless communication modules 42 and the mobile device. In conclusion, it will be ended if the real positioning location can be determined.

When the environment inference factor is ignorable, and the i-th first antenna and the i-th second antenna are unable to position the mobile device, the processing module switches antennas by the following method.

When one of the following conditions is satisfied, the processing module 440 calculates a first difference between the fifth gain (G$_5$) corresponding to a first angle (θ$_1$) and the seventh gain (G$_7$) corresponding to a three angle (θ$_3$) and a second difference between the sixth gain (G$_6$) corresponding to a second angle (θ$_2$) and the eighth gain (G$_8$) corresponding to (θ$_4$) for each of the remainder first antennas and each of the M−1 corresponding second antennas.

$G_5 > G_7$ and $G_6 < G_8$.         Condition 1

$G_5 < G_7$ and $G_6 > G_8$.         Condition 2

When one of the first differences and one of the second differences are the maximum as compared with others, the processing module 440 switches the i-th first antenna to the corresponding first antenna and switches the i-th second antenna to the corresponding second antenna.

Afterward, the mobile device transmits a third receive signal strength (RSS$_3$) to the switched first antenna and transmits a fourth receive signal strength (RSS$_4$) to the switched second antenna. The processing module 440 obtains a fifth gain (G$_5$) corresponding to the first angle (θ$_1$) and a sixth gain (G$_6$) corresponding to the second angle (θ$_2$) based on the first antenna gain table corresponding to the switched first antenna. In the meanwhile, the processing module 440 obtains a seventh gain ($G_7$) corresponding to the third angle ($\theta_3$) and an eighth gain ($G_8$) corresponding to the fourth angle ($\theta_4$) based on the second antenna gain table corresponding to the switched second antenna. When one of the following inequalities is satisfied, the processing module 440 judges that the mobile device is located at the first position $P_1$ shown in FIG. 4.

$$\frac{\Phi_3 - \Phi_4}{\Phi_3} * 100\% \geq \text{a second predetermined value.} \quad \text{Inequality 6}$$

$$|\Delta_3 - \Delta'| \leq |\Delta_4 - \Delta'|; \text{ wherein, } \Delta_3 = \frac{K_5 - K_7}{K_5}, \Delta_4 = \frac{K_6 - K_8}{K_6}, \quad \text{Inequality 7}$$

$$\Delta' = \frac{RSS_3 - RSS_4}{RSS_3}, \Phi_3 = \frac{\Delta_3 - \Delta'}{\Delta_3}, \Phi_4 = \frac{\Delta_4 - \Delta'}{\Delta_4},$$

$$K_5 = \frac{G_5}{d_1^2}, K_6 = \frac{G_6}{d_1^2}, K_7 = \frac{G_7}{d_2^2} \text{ and } K_8 = \frac{G_8}{d_2^2}.$$

On the other hand, when both of the following inequalities are satisfied, the processing module 440 judges that the mobile device is located at the second position $P_2$ shown in FIG. 4.

$$\frac{\Phi_3 - \Phi_4}{\Phi_3} * 100\% \geq \text{the second predetermined value.} \quad \text{Inequality 6}$$

$$|\Delta_4 - \Delta'| \leq |\Delta_3 - \Delta'|. \quad \text{Inequality 8}$$

When the environment inference factor is significant, or the i-th first antenna and the i-th second antenna are unable to position the mobile device, antennas are switched by the following method.

When one of the following conditions is satisfied, the processing module 440 calculates a third difference between the ninth gain ($G_9$) corresponding to the first angle ($\theta_1$) and the original first gain ($G_1$), and calculates a fourth difference between the tenth gain ($G_{10}$) corresponding to the second angle ($\theta_2$) and the original second gain ($G_2$) for each of the remainder first antennas.

$$G_9 > G_1 \text{ and } G_{10} < G_2. \quad \text{Condition 11}$$

$$G_9 < G_1 \text{ and } G_{10} > G_2. \quad \text{Condition 12}$$

When one of the third differences and one of the fourth differences are the maximum as compared with others, the processing module 440 then switches the i-th first antenna to the corresponding first antenna.

Furthermore, when one of the following conditions is satisfied, the processing module 440 calculates a fifth difference between the eleventh gain ($G_{11}$) corresponding to the third angle ($\theta_3$) and the original third gain ($G_3$) and a sixth difference between the twelfth gain ($G_{12}$) corresponding to the fourth angle ($\theta_4$) and the original fourth gain ($G_4$) for each of the remainder second antennas.

$$G_{11} > G_3 \text{ and } G_{12} < G_4. \quad \text{Condition 13}$$

$$G_{11} < G_3 \text{ and } G_{12} > G_4. \quad \text{Condition 14}$$

When one of the fifth differences and one of the sixth differences are the maximum as compared with others, the processing module 440 switches the i-th first antenna to the corresponding second antenna.

Afterward, the mobile device transmits a fifth receive signal strength ($RSS_5$) to the switched first antenna and transmits a sixth receive signal strength ($RSS_6$) to the switched second antenna. The processing module 440 obtains a ninth gain ($G_9$) corresponding to the first angle ($\theta_1$) and a tenth gain ($G_{10}$) corresponding to the second angle ($\theta_2$) based on the first antenna gain table corresponding to the switched first antenna, and obtains an eleventh gain ($G_{11}$) corresponding to the third angle ($\theta_3$) and a twelfth gain ($G_{12}$) corresponding to the fourth angle ($\theta_4$) based on the second antenna gain table corresponding to the switched second antenna.

When one of the following conditions is satisfied, the processing module 440 judges that the mobile device is located at the first position Pi shown in FIG. 4.

$$G_9 > G_1, RSS_5 > RSS_1 \text{ and } G_{10} \leq G_2. \quad \text{Condition 3}$$

$$G_9 < G_1, RSS_5 < RSS_1 \text{ and } G_{10} \geq G_2. \quad \text{Condition 4}$$

On the other hand, when one of the following conditions is satisfied, the processing module 440 judges that the mobile device is located at the second position $P_2$ shown in FIG. 4.

$$G_{10} > G_2, RSS_5 > RSS_1 \text{ and } G_9 \leq G_1. \quad \text{Condition 5}$$

$$G_{10} < G_2, RSS_5 < RSS_1 \text{ and } G_9 \geq G_1. \quad \text{Condition 6}$$

When one of the following conditions is satisfied, the processing module 440 judges that the mobile device is located at the first position $P_1$ shown in FIG. 4:

$$G_{11} > G_3, RSS_6 > RSS_2 \text{ and } G_{12} \leq G_4. \quad \text{Condition 7}$$

$$G_{11} < G_3, RSS_6 < RSS_2 \text{ and } G_{12} \geq G_4. \quad \text{Condition 8}$$

On the other hand, when one of the following conditions is satisfied, the processing module 440 judges that the mobile device is located at the second position $P_2$ shown in FIG. 4.

$$G_{12} > G_4, RSS_6 > RSS_2 \text{ and } G_{11} \leq G_3. \quad \text{Condition 9}$$

$$G_{12} < G_4, RSS_6 < RSS_2 \text{ and } G_{11} \geq G_3. \quad \text{Condition 10}$$

According to the second embodiment described as above, the positioning system of this invention can find the most suitable antenna for positioning the mobile device before switching antennas, so as to avoid meaningless calculations.

It should be noticed that if the first and second wireless communication module 40 and 42 utilize RSS algorithm to position the mobile device after the antenna is switched, the mobile device has to be re-positioned to obtain a new distance d and angle θ. And, if the new angle θ is different to the old angle θ, the new angle θ is being substituted for the old angle θ.

Besides, the invention also can utilize the positioning system 4' shown in FIG. 3B or the positioning system 4" shown in FIG. 3C to judge that the mobile device is located at the position $P_1$ or the position $P_2$ shown in FIG. 4. The hardware system 44 can be substituted by the hardware system 44a or 44b; the processing module 440 can be substituted by the processing module 440a or 440b, and the storage module 442 can be substituted by the storage module 442a or 442b, which all depends on practical applications.

Figure 7A:
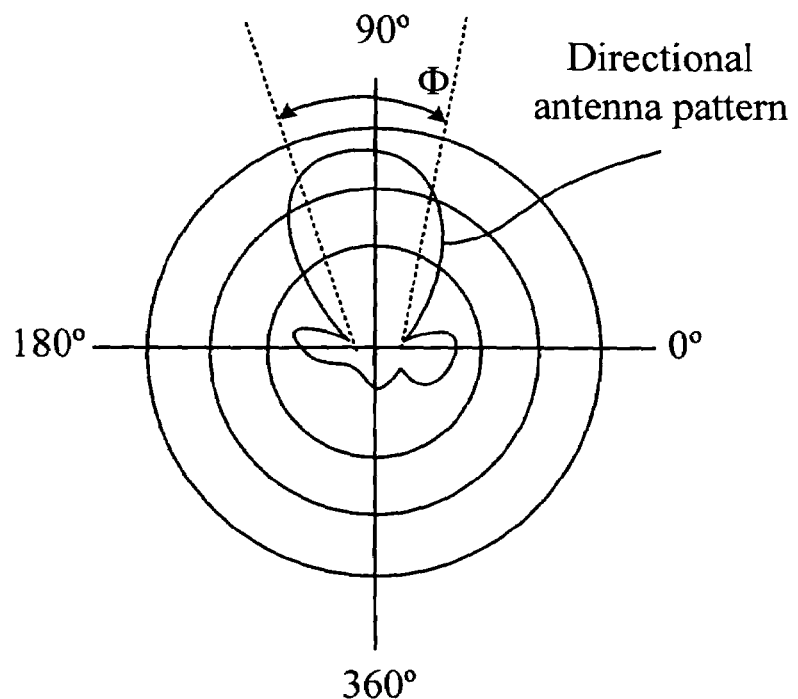
FIG. 7A is a schematic diagram illustrating a directional antenna pattern.
Figure 7B:
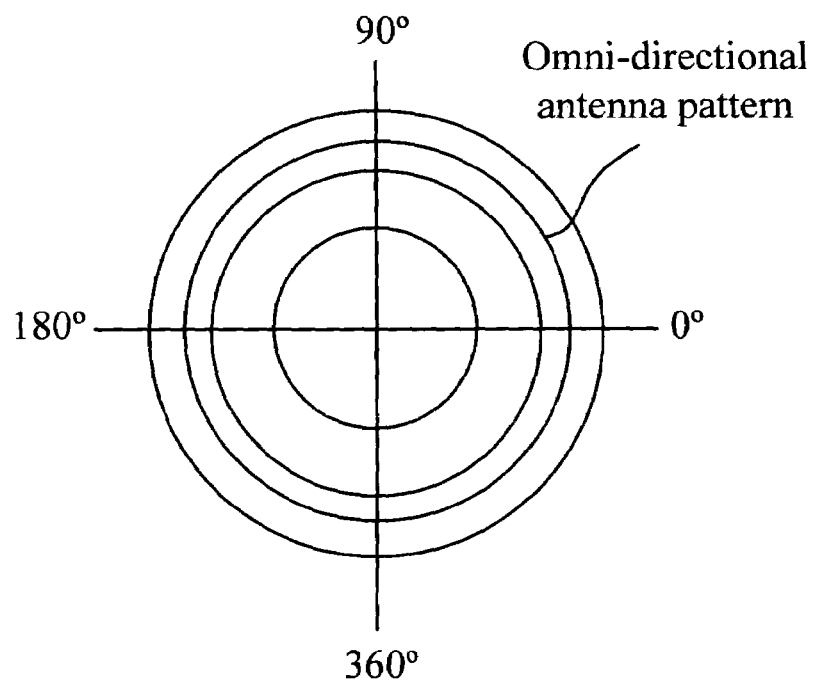
FIG. 7B is a schematic diagram illustrating an omni-directional antenna pattern.

Please refer to FIG. 7A and FIG. 7B. FIG. 7A is a schematic diagram illustrating a directional antenna pattern. FIG. 7B is a schematic diagram illustrating an omni-directional antenna pattern. The patterns adopted by the invention can be a directional antenna pattern (shown as FIG. 7A) cooperating with an omni-directional antenna pattern (shown as FIG. 7B) to recover weak communication signal in certain directions in the directional antenna pattern. In the practice of the invention presented, it is certainly better to have more antennas with the directional antenna pattern and to decrease the areas which are hard to make a judgment upon positioning. Besides, it also can utilize a switch between the directional antenna pattern and the omni-directional antenna pattern to assist in judging the position. The Φ shown in FIG. 7A indicates an angle occupied by a principle half-power beamwidths of a directional antenna.

Figure 8A:
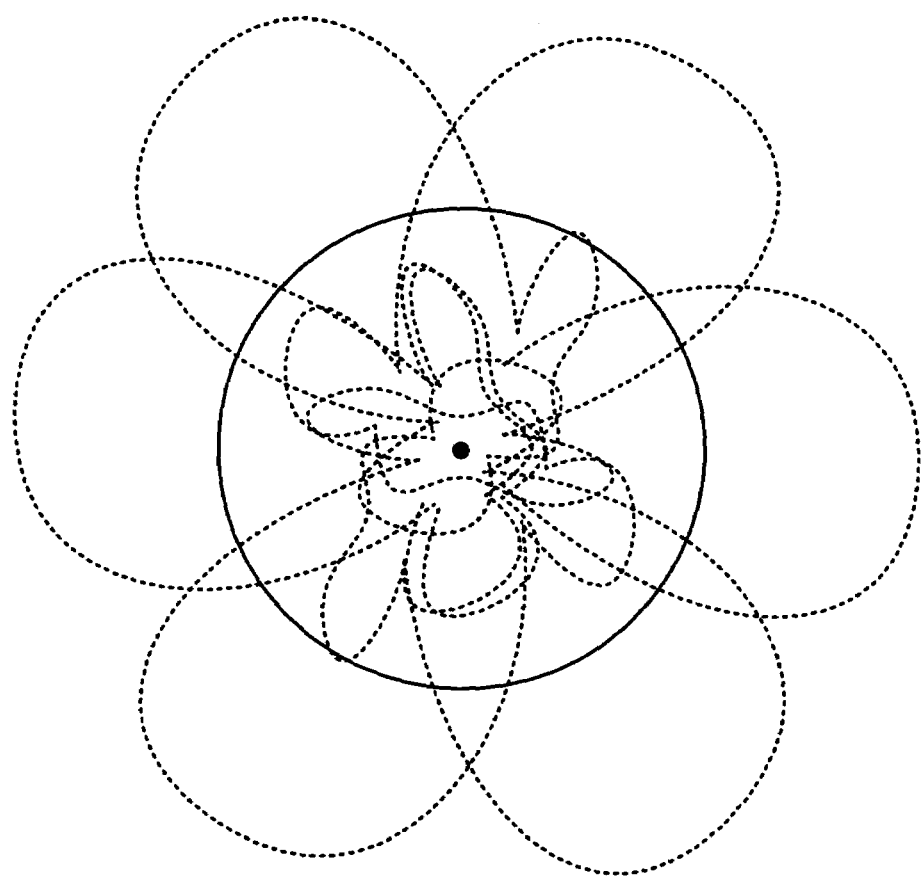
FIG. 8A is a schematic diagram illustrating six directional antennas and one omni-directional antenna.
Figure 8B:
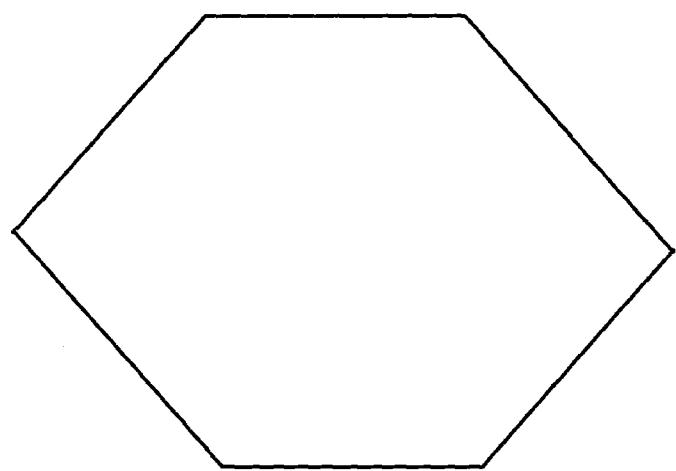
FIG. 8B is a schematic diagram illustrating geometrical shape of an antenna pattern shown in FIG. 8A.
Figure 9A:
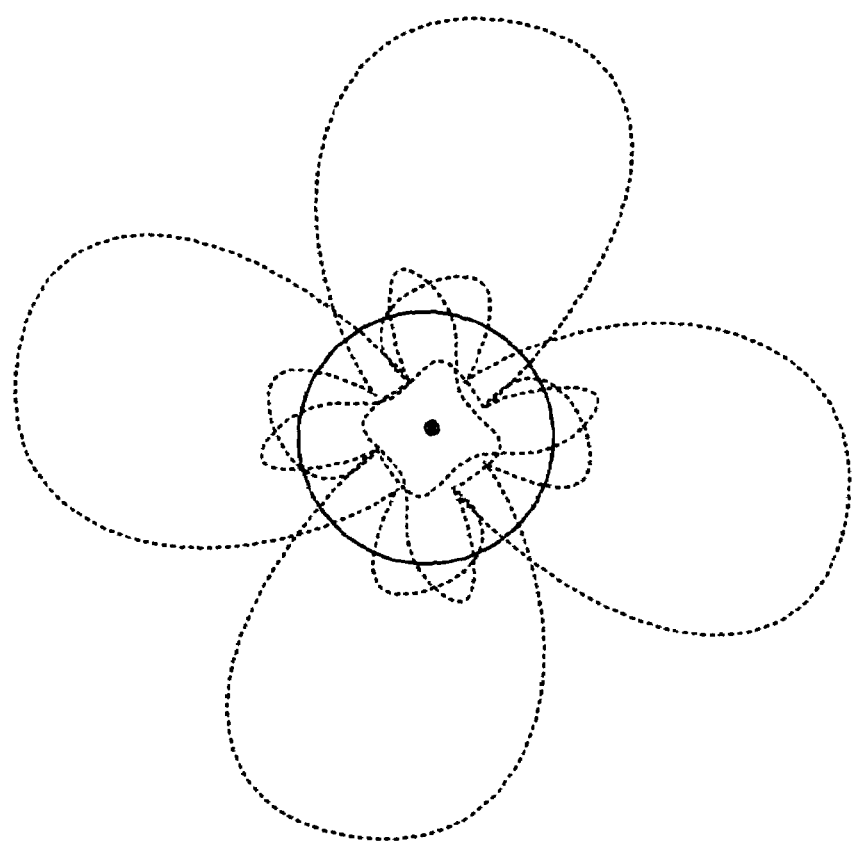
FIG. 9A is a schematic diagram illustrating four directional antennas and one omni-directional antenna.
Figure 9B:
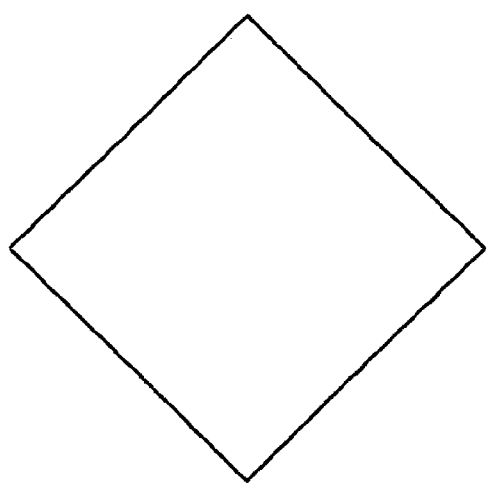
FIG. 9B is a schematic diagram illustrating geometrical shape of an antenna pattern shown in FIG. 9A.
Figure 10A:
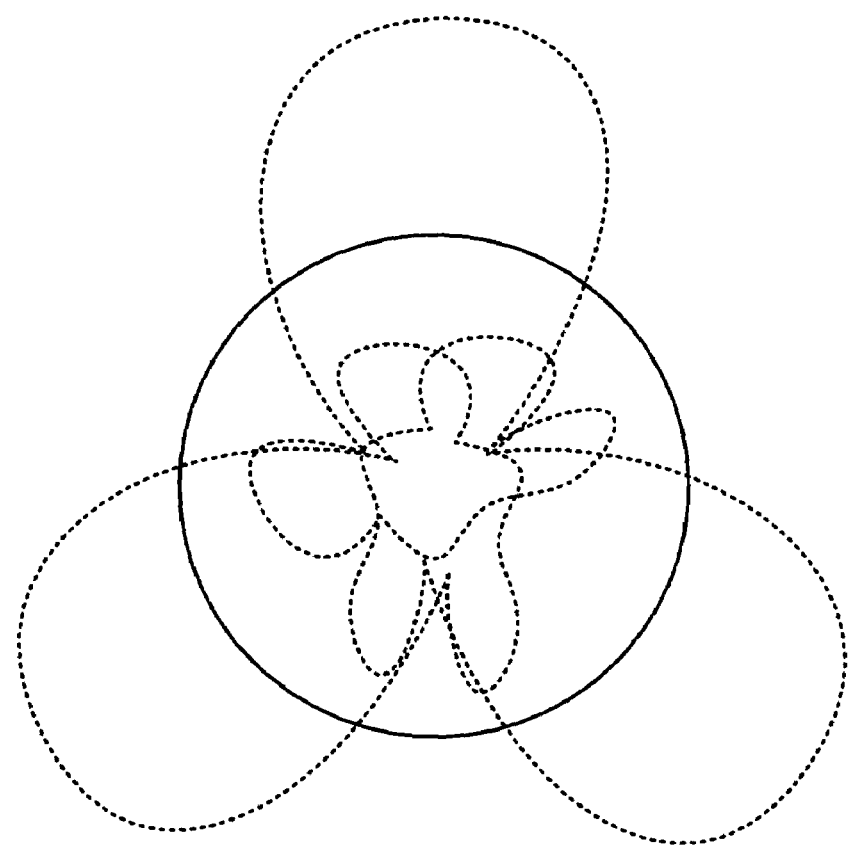
FIG. 10A is a schematic diagram illustrating three directional antennas and one omni-directional antenna.
Figure 10B:
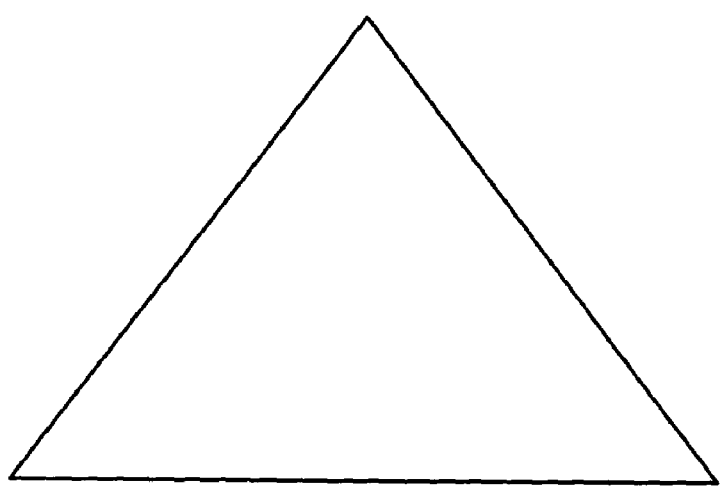
FIG. 10B is a schematic diagram illustrating geometrical shape of an antenna pattern shown in FIG. 10A.

Please refer to FIG. 8A and FIG. 10B. FIG. 8A is a schematic diagram illustrating six directional antennas and one omni-directional antenna. FIG. 8B is a schematic diagram illustrating geometrical shape of an antenna pattern shown in FIG. 8A. FIG. 9A is a schematic diagram illustrating four directional antennas and one omni-directional antenna. FIG. 9B is a schematic diagram illustrating geometrical shape of an antenna pattern shown in FIG. 9A. FIG. 10A is a schematic diagram illustrating three directional antennas and one omni-directional antenna. FIG. 10B is a schematic diagram illustrating geometrical shape of an antenna pattern shown in FIG. 10A.

In order to decrease the areas which are hard to make a judgment upon positioning, the invention provides three kinds of antenna switching modes shown in FIG. 8A, FIG. 9A and FIG. 10A. The main difference among the three modes is the range and accuracy in positioning. FIG. 8A is the best, and FIG. 9A is the second. Geometrical shape of positioning ranges in the three modes are shown as FIG. 8B, FIG. 9B and FIG. 10B. In order to have better effect on judging, the invention can further set following rules:

(1) the gain of directional antenna at principle half-power beamwidths is 3 dB larger than that of omni-directional antenna;

(2) if the number of directional antenna in use is larger than six, gain of directional antenna at principle half-power beamwidths can be at least 6 dB larger than that of omni-directional antenna;

(3) if the number of directional antenna in use is six, and the Φ can be between 30 degrees and 60 degrees;

(4) if the number of directional antenna in use is five, and the Φ can be between 30 degrees and 72 degrees;

(5) if the number of directional antenna in use is four, and the Φ can be between 45 degrees and 90 degrees.

(6) if the number of directional antenna in use is three, and the Φ can be between 60 degrees and 120 degrees.

Accordingly, if they are unable to position the mobile device, the invention still can assist in positioning by utilizing following methods:

(1) According to RSS database corresponding to positioned location in the past, compared with the points which are hard to be judged. Because d obtained from the original method and the positions of $P_1$ and $P_2$ are well-defined, it is only required to confirm the directions now. Therefore, the method is to compare RSS corresponding to the possible position $P_1$ and $P_2$ with the database of RSS data corresponding to the point position which is formed in a two-dimension X-Y plan. It can be judged by checking the approximation degree of RSS corresponding to the possible position $P_1$ and $P_2$ and database. If the database is lack of RSS data at the point position, obtain it by the least-square method.

(2) If there are some devices with a function of positioning (TOA or RSS) nearby, they can assist in antennas positioning of the first and second wireless communication modules 40 and 42.

It has to be noticed that the positioning system of the invention is applicable not only to that both the first and second wireless communication modules 40 and 42 are fixed but also to that the first and second wireless communication modules 40 and 42 are mobile; while applying to mobile wireless communication modules, directional sensor, for example gyro, has to be provided thereon.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An antenna-assisted two-point positioning system for positioning a mobile device, comprising:

a first wireless communication module comprising M first antennas, the mobile device transmitting a first signal strength to the i-th first antenna for a first receive signal strength ($RSS_1$), M being an integer larger than or equal to 1, i being an integer between 1 and M;

a second wireless communication module comprising N second antennas, the mobile device transmitting a second signal strength to the j-th second antenna for a second receive signal strength ($RSS_2$), the second wireless communication module cooperating with the first wireless communication module to determine a first position and a second position corresponding to the mobile device, N being an integer larger than or equal to 1, N being different from M, j being an integer between 1 and N;

a storage module for storing M first antenna gain tables corresponding to the M first antennas and N second antenna gain tables corresponding to the N second antennas; and a processing module for judging whether an environmental interference factor is ignorable; when the environmental interference factor is ignorable, the processing module judging that the mobile device is located at the first or second position based on the first receive signal strength ($RSS_1$), the second receive signal strength ($RSS_2$), the i-th first antenna gain table and the j-th second antenna gain table;

wherein based on a distance ($d_1$) between the mobile device and the first communication module, a distance ($d_2$) between the mobile device and the second communication module, and a distance between the first communication module and the second communication module, the processing module calculates a first angle, a second angle, a third angle and a fourth angle utilizing cosine theorem, wherein each of the M first antenna gain tables and each of the N second antenna gain tables respectively record a plurality of angles and a plurality of gains, and each gain is respectively corresponding to one of the angles, wherein the processing module obtains a first gain ($G_1$) corresponding to the first angle and a second gain ($G_2$) corresponding to the second angle based on the i-th first antenna gain table, and obtains a third gain ($G_3$) corresponding to the third angle and a fourth gain ($G_4$) corresponding to the fourth angle based on the j-th second antenna gain table, once at least one of the following inequalities is satisfied, the processing module judges that the environmental interference factor is ignorable:

$$\left| \frac{K_1 - K_3}{K_1} * 100\% - \frac{RSS_1 - RSS_2}{RSS_1} * 100\% \right| \leq \quad \text{inequality 1}$$

a first predetermined value; and

-continued $$\left|\frac{K_2 - K_4}{K_2} * 100\% - \frac{RSS_1 - RSS_2}{RSS_1} * 100\%\right| \leq$$ inequality 2 the first predetermined value; $K_1 = \frac{G_1}{d_1^2}$, $$K_2 = \frac{G_2}{d_1^2}, K_3 = \frac{G_3}{d_2^2} \text{ and } K_4 = \frac{G_4}{d_2^2}.$$

2. The positioning system of claim 1, wherein once the environmental interference factor is ignorable and both of the following inequalities are satisfied, the processing module judges that the mobile device is located at the first position:

$$\frac{\Phi_1 - \Phi_2}{\Phi_1} * 100\% \geq \text{a second predetermined value; and}$$ inequality 3

$$|\Delta_1 - \Delta| \leq |\Delta_2 - \Delta|; \text{ wherein, } \Delta_1 = \frac{K_1 - K_3}{K_1}, \Delta_2 = \frac{K_2 - K_4}{K_2},$$ inequality 4

$$\Delta = \frac{RSS_1 - RSS_2}{RSS_1}, \Phi_1 = \frac{\Delta_1 - \Delta}{\Delta_1} \text{ and } \Phi_2 = \frac{\Delta_2 - \Delta}{\Delta_2}.$$

3. The positioning system of claim 2, wherein once the environmental interference factor is ignorable and both of the following inequalities are satisfied, the processing module judges that the mobile device is located at the second position:

$$\frac{\Phi_1 - \Phi_2}{\Phi_1} * 100\% \geq \text{the second predetermined value; and}$$ inequality 3

$$|\Delta_2 - \Delta| \leq |\Delta_1 - \Delta|.$$ inequality 5

4. The positioning system of claim 2, wherein once the environmental inference factor is significant, or the i-th first antenna and j-th second antenna are unable to position the mobile device, the processing module switches the i-th first antenna to one of the remainder M−1 first antennas, the mobile device transmits a third receive signal strength ($RSS_3$) to the switched first antenna; the processing module obtains a fifth gain ($G_5$) corresponding to the first angle and a sixth gain ($G_6$) corresponding to the second angle based on the first antenna gain table corresponding to the switched first antenna, and once one of the following conditions is satisfied, the processing module judges that the mobile device is located at the first position:

$G_5 > G_1$, $RSS_3 > RSS_1$ and $G_6 \leq G_2$; and  condition 1

$G_5 < G_1$, $RSS_3 < RSS_1$ and $G_6 \geq G_2$.  condition 2

5. The positioning system of claim 4, wherein once one of the following conditions is satisfied, the processing module judges that the mobile device is located at the second position:

$G_6 > G_2$, $RSS_3 > RSS_1$ and $G_5 \leq G_1$; and  condition 3

$G_6 < G_2$, $RSS_3 < RSS_1$ and $G_5 \geq G_6$.  condition 4

6. The positioning system of claim 2, wherein once the environmental interference factor is significant, or the i-th first antenna and j-th second antenna are unable to position the mobile device, the processing module switches the j-th second antenna to one of the remainder N−1 second antennas, the mobile device transmits a fourth receive signal strength ($RSS_4$) to the switched second antenna, the processing module obtains a seventh gain ($G_7$) corresponding to the third angle and an eighth gain ($G_8$) corresponding to the fourth angle based on the second antenna gain table corresponding to the switched second antenna, and once one of the following conditions is satisfied, the processing module judges that the mobile device is located at the first position:

$G_7 > G_3$, $RSS_4 > RSS_2$ and $G_8 \leq G_4$; and  condition 5

$G_7 < G_3$, $RSS_4 < RSS_2$ and $G_8 \geq G_4$.  condition 6

7. The positioning system of claim 6, wherein once one of the following conditions is satisfied, the processing module judges that the mobile device is located at the second position:

$G_8 > G_4$, $RSS_4 > RSS_2$ and $G_7 \leq G_3$; and  condition 7

$G_8 < G_4$, $RSS_4 < RSS_2$ and $G_7 \geq G_3$.  condition 8

8. An antenna-assisted two-point positioning system for positioning a mobile device, comprising:

a first wireless communication module comprising M first antennas, the mobile device transmitting a first signal strength to the i-th first antenna for a first receive signal strength ($RSS_1$), M being an integer larger than or equal to 1, i being an integer between 1 and M;

a second wireless communication module comprising M second antennas, the mobile device transmitting a second signal strength to the i-th second antenna for a second receive signal strength ($RSS_2$), the second wireless communication module cooperating with the first wireless communication module to determine a first position and a second position corresponding to the mobile device, each of the M second antennas respectively corresponding to one of the M first antennas;

a storage module for storing M first antenna gain tables corresponding to the M first antennas and M second antenna gain tables corresponding to the M second antennas; and a processing module for judging whether an environmental interference factor is ignorable; when environment interference factor is ignorable, the processing module judging that the mobile device is located at the first or second position based on the first receive signal strength ($RSS_1$), the second receive signal strength ($RSS_2$), the i-th first antenna gain table and i-th second antenna gain table;

wherein based on a distance ($d_1$) between the mobile device and the first communication module, a distance ($d_2$) between the mobile device and the second communication module, and a distance between the first communication module and the second communication module, the processing module calculates a first angle, a second angle, a third angle and a fourth angle utilizing cosines theorem, wherein each of the M first antenna gain tables and each of the M second antenna gain tables respectively record a plurality of angles and a plurality of gains, each gain is respectively corresponding to one of the angles, wherein the processing module obtains a first gain ($G_1$) corresponding to the first angle and a second gain ($G_2$) corresponding to the second angle based on the i-th first antenna gain table, and obtains a third gain ($G_3$) corresponding to the third angle and a fourth gain ($G_4$) corresponding to the fourth angle based on the i-th second antenna gain table, once at least one of the following inequalities is satisfied, the processing module judges that the environmental interference factor is ignorable:

$$\left| \frac{K_1 - K_3}{K_1} * 100\% - \frac{RSS_1 - RSS_2}{RSS_1} * 100\% \right| \leq \quad \text{inequality 1}$$

a first predetermined value;

and $$\left| \frac{K_2 - K_4}{K_2} * 100\% - \frac{RSS_1 - RSS_2}{RSS_1} * 100\% \right| \leq \quad \text{inequality 2}$$

the first predetermined value;

$$K_1 = \frac{G_1}{d_1^2}, K_2 = \frac{G_2}{d_1^2}, K_3 = \frac{G_3}{d_2^2} \text{ and } K_4 = \frac{G_4}{d_2^2}.$$

9. The positioning system of claim 8, wherein once the environment interference factor is ignorable and both of the following inequalities are satisfied, the processing module judges that the mobile device is located at the first position:

$$\frac{\Phi_1 - \Phi_2}{\Phi_1} * 100\% \geq \text{a second predetermined value; and} \quad \text{inequality 3}$$

$$|\Delta_1 - \Delta| \leq |\Delta_2 - \Delta|; \text{ wherein, } \Delta_1 = \frac{K_1 - K_3}{K_1}, \Delta_2 = \frac{K_2 - K_4}{K_2}, \quad \text{inequality 4}$$

$$\Delta = \frac{RSS_1 - RSS_2}{RSS_1}, \Phi_1 = \frac{\Delta_1 - \Delta}{\Delta_1} \text{ and } \Phi_2 = \frac{\Delta_2 - \Delta}{\Delta_2}.$$

10. The positioning system of claim 9, wherein once the environment interference factor is ignorable and both of the following inequalities are satisfied, the processing module judges that the mobile device is located at the second position:

$$\frac{\Phi_1 - \Phi_2}{\Phi_1} * 100\% \square \text{ the second predetermined value; and} \quad \text{inequality 3}$$

$$|\Delta_2 - \Delta| \leq |\Delta_1 - \Delta|. \quad \text{inequality 5}$$

11. The positioning system of claim 9, wherein once the environment interference factor is ignorable, and the i-th first antenna and i-th second antenna are unable to position the mobile device, the processing module switches the i-th first antenna to one of the remainder M−1 first antennas, and switches the i-th second antenna to one of the remainder M−1 second antennas, the mobile device transmits a third receive signal strength ($RSS_3$) to the switched first antenna and transmits a fourth receive signal strength ($RSS_4$) to the switched second antenna, the processing module obtains a fifth gain ($G_5$) corresponding to the first angle and a sixth gain ($G_6$) corresponding to the second angle based on the first antenna gain table corresponding to the switched first antenna, the processing module obtains a seventh gain ($G_7$) corresponding to the third angle and an eighth gain ($G_8$) corresponding to the fourth angle based on the second antenna gain table corresponding to the switched second antenna and once one of the following inequalities is satisfied, the processing module judges that the mobile device is located at the first position:

$$\frac{\Phi_3 - \Phi_4}{\Phi_3} * 100\% \leq \text{a second predetermined value;} \quad \text{inequality 6}$$

and $$|\Delta_3 - \Delta'| \leq |\Delta_4 - \Delta'|; \quad \text{inequality 7}$$

wherein, $$\Delta_3 = \frac{K_5 - K_7}{K_5}, \Delta_4 = \frac{K_6 - K_8}{K_6}, \Delta' = \frac{RSS_3 - RSS_4}{RSS_3},$$

$$\Phi_3 = \frac{\Delta_3 - \Delta'}{\Delta_3}, \Phi_4 = \frac{\Delta_4 - \Delta'}{\Delta_4}, K_5 = \frac{G_5}{d_1^2},$$

$$K_6 = \frac{G_6}{d_1^2}, K_7 = \frac{G_7}{d_2^2} \text{ and } K_8 = \frac{G_8}{d_2^2}.$$

12. The positioning system of claim 11, wherein once both of the following inequalities are satisfied, the processing module judges that the mobile device is located at the second position:

$$\frac{\Phi_3 - \Phi_4}{\Phi_3} * 100\% \geq \text{the second predetermined value; and} \quad \text{inequality 6}$$

$$|\Delta_4 - \Delta'| \leq |\Delta_3 - \Delta'|. \quad \text{inequality 8}$$

13. The positioning system of claim 8, wherein once the environment interference factor is significant, or the i-th first antenna and the i-th second antenna are unable to position the mobile device, the processing module switches the i-th first antenna to one of the remainder M−1 first antennas, and switches the i-th second antenna to one of the remainder M−1 second antennas, the mobile device transmits a fifth receive signal strength ($RSS_5$) to the switched first antenna and transmits a sixth receive signal strength ($RSS_6$) to the switched second antenna, the processing module obtains a ninth gain ($G_9$) corresponding to the first angle and a tenth gain ($G_{10}$) corresponding to the second angle based on the first antenna gain table corresponding to the switched first antenna, the processing module obtains an eleventh gain ($G_{11}$) corresponding to the third angle ($\theta_3$) and a twelfth gain ($G_{12}$) corresponding to the fourth angle ($\theta_4$) based on the second antenna gain table corresponding to the switched second antenna, wherein once one of the following conditions is satisfied, the processing module judges that the mobile device is located at the first position:

$$G_9 > G_1, RSS_5 > RSS_1 \text{ and } G_{10} \leq G_2; \text{ and} \quad \text{condition 3}$$

$$G_9 < G_1, RSS_5 < RSS_1 \text{ and } G_{10} \geq G_2. \quad \text{condition 4}$$

14. The positioning system of claim 8, wherein once the environment interference factor is significant, or the i-th first antenna and the i-th second antenna are unable to position the mobile device, the processing module switches the i-th first antenna to one of the remainder M−1 first antennas, and switches the i-th second antenna to one of the remainder M−1 second antennas, the mobile device transmits a fifth receive signal strength ($RSS_5$) to the switched first antenna and transmits a sixth receive signal strength ($RSS_6$) to the switched second antenna, the processing module obtains a ninth gain ($G_9$) corresponding to the first angle and a tenth gain ($G_{10}$) corresponding to the second angle based on the first antenna gain table corresponding to the switched first antenna, the processing module obtains an eleventh gain ($G_{11}$) corresponding to the third angle ($\theta_3$) and a twelfth gain ($G_{12}$) corresponding to the fourth angle ($\theta_4$) based on the second antenna gain table corresponding to the switched second antenna, wherein once one of the following conditions is satisfied, the processing module judges that the mobile device is located at the second position:

$G_{10} > G_2$, $RSS_5 > RSS_1$ and $G_9 \leq G_1$; and    condition 5

$G_{10} < G_2$, $RSS_5 < RSS_1$ and $G_9 \geq G_1$.    condition 6

15. The positioning system of claim 8, wherein once the environment interference factor is significant, or the i-th first antenna and the i-th second antenna are unable to position the mobile device, the processing module switches the i-th first antenna to one of the remainder M−1 first antennas, and switches the i-th second antenna to one of the remainder M−1 second antennas, the mobile device transmits a fifth receive signal strength ($RSS_5$) to the switched first antenna and transmits a sixth receive signal strength ($RSS_6$) to the switched second antenna, the processing module obtains a ninth gain ($G_9$) corresponding to the first angle and a tenth gain ($G_{10}$) corresponding to the second angle based on the first antenna gain table corresponding to the switched first antenna, the processing module obtains an eleventh gain ($G_{11}$) corresponding to the third angle ($\theta_3$) and a twelfth gain ($G_{12}$) corresponding to the fourth angle ($\theta_4$) based on the second antenna gain table corresponding to the switched second antenna,, wherein once one of the following conditions is satisfied, the processing module judges that the mobile device is located at the first position:

$G_{11} > G_3$, $RSS_6 > RSS_2$ and $G_{12} \leq G_4$; and    condition 7

$G_{11} < G_3$, $RSS_6 < RSS_2$ and $G_{12} \geq G_4$.    condition 8

16. The positioning system of claim 8, wherein once the environment interference factor is significant, or the i-th first antenna and the i-th second antenna are unable to position the mobile device, the processing module switches the i-th first antenna to one of the remainder M−1 first antennas, and switches the i-th second antenna to one of the remainder M−1 second antennas, the mobile device transmits a fifth receive signal strength ($RSS_5$) to the switched first antenna and transmits a sixth receive signal strength ($RSS_6$) to the switched second antenna, the processing module obtains a ninth gain ($G_9$) corresponding to the first angle and a tenth gain ($G_{10}$) corresponding to the second angle based on the first antenna gain table corresponding to the switched first antenna, the processing module obtains an eleventh gain ($G_{11}$) corresponding to the third angle ($\theta_3$) and a twelfth gain ($G_{12}$) corresponding to the fourth angle ($\theta_4$) based on the second antenna gain table corresponding to the switched second antenna,, wherein once one of the following conditions is satisfied, the processing module judges that the mobile device is located at the second position:

$G_{12} > G_4$, $RSS_6 > RSS_2$ and $G_{11} \leq G_3$; and    condition 9

$G_{12} < G_4$, $RSS_6 < RSS_2$ and $G_{11} \geq G_3$.    condition 10

* * * * *